(12) United States Patent
Groomes

(10) Patent No.: US 7,712,703 B2
(45) Date of Patent: May 11, 2010

(54) FLAP SIMULATORS

(75) Inventor: Kim C. Groomes, Hartland, MI (US)

(73) Assignee: Pentastar Aviation, Inc., Waterford, MI ( * ) Notice: Subject to any disclaimer, the term of this patent is extended or adjusted under 35 U.S.C. 154(b) by 1150 days.

(21) Appl. No.: 11/334,171

(22) Filed: Jan. 18, 2006

(65) Prior Publication Data

US 2007/0164153 A1 Jul. 19, 2007

(51) Int. Cl.
*B64C 9/02* (2006.01)

(52) U.S. Cl. .................. 244/118.2; 244/1 R; 244/213; 73/802

(58) Field of Classification Search ........... 244/213, 244/214, 215, 216, 217, 1 R, 117 R, 118.2; 73/802

See application file for complete search history.

(56) References Cited

U.S. PATENT DOCUMENTS

| | | | | |
|---|---|---|---|---|
| 2,436,583 A | * | 2/1948 | Lear | 116/284 |
| 4,248,395 A | * | 2/1981 | Cole | 244/216 |
| 4,995,575 A | * | 2/1991 | Stephenson | 244/216 |
| 5,564,655 A | * | 10/1996 | Garland et al. | 244/216 |
| 6,299,108 B1 | * | 10/2001 | Lindstrom et al. | 244/213 |
| 2002/0069706 A1 | * | 6/2002 | Uchida et al. | 73/802 |

OTHER PUBLICATIONS

Definition for "handle" from www.encarta.msn.com.*
Picture of Wing Flap.

* cited by examiner

*Primary Examiner*—Benjamin P Lee
(74) *Attorney, Agent, or Firm*—Carlson, Gaskey & Olds PC

(57) ABSTRACT

A flap simulator for an aircraft has a support with a handle. A first couple is on the support and is selectively engageable to a flap track for guiding an aircraft flap. A second couple is also on the support and is selectively engageable to a flap actuator for moving the aircraft flap along the flap track. The support may have an adjustment feature that allows a size of the second couple to be changed to accommodate the flap actuator. The support is apart from the aircraft flap.

5 Claims, 5 Drawing Sheets

FLAP SIMULATORS

BACKGROUND OF THE INVENTION

This invention relates to a flap simulator for an aircraft.

An aircraft generally has a flap associated with each wing of the aircraft. The flap controls the braking as well as the ascent and descent of the aircraft by moving along a track on the wing. A motorized drive moves the flap along this track to orient the flap up or down relative to the wing.

In the service of the aircraft, it may be necessary to remove the flap from the wing of the aircraft. The flap is disengaged from the motorized drive and then removed from the track that supports the flap on the wing. Typically, the motorized drive has a long threaded rod that is rotated by a motor to move the flap along the track. The motorized drive follows, to some degree, the path of the flap and is accordingly free to move relative to the wing of the aircraft. Because of this design, the threaded rod will flop downward when the flap is removed from the wing.

To test the motorized drive of the flap, a technician is required to hold the threaded rod of the drive as if the flap were installed. Each flap may have multiple tracks and accordingly multiple technicians are required to support each of the threaded rods as the motorized drives are run. Each of these technicians must be attentive during this testing process to avoid causing damage to the motorized drive.

It is therefore desirable to produce an assembly or device that permits the motorized drive of the aircraft to be tested and supported without the additional labor associated with current maintenance techniques.

SUMMARY OF THE INVENTION

The present invention comprises a flap simulator for an aircraft. The flap simulator has a support with a handle. The support has a couple that selectively engages a flap track of the aircraft wing. The support also has another couple that allows engagement of the support to a flap actuator that moves the aircraft flap along the flap track. The support is decoupled from the aircraft flap. In this way, a smaller and lighter weight support may be used to secure the flap actuator to the flap track.

The support may have guide structure, such as rollers, to direct the support along the flap track. The support may then be driven by the flap actuator along the flap track. This feature allows the motorized drive to be tested without a technician supporting the actuator.

The first couple may be rigidly linked to the second couple to prevent relative movement between the first couple and the second couple. This feature secures the flap actuator to the flap track. In this way, the actuator may be permitted to drive the support in the same manner that it drives the flap without the bulk and weight of the flap. The small size of the support also permits the inner workings of the motorized drive and wing to be observed without the flap obstructing the view of the service technician.

The invention further comprises a novel technique for servicing the aircraft. The aircraft flap is disconnected from the flap actuator that moves the aircraft flap on the aircraft. The aircraft flap is then removed from the flap track of the aircraft wing. A support is coupled to the actuator and further coupled to the flap track. The size of the support may be adjusted to accommodate the size of the actuator. The support may then be moved along the track by activating the flap actuator without the flap in place.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
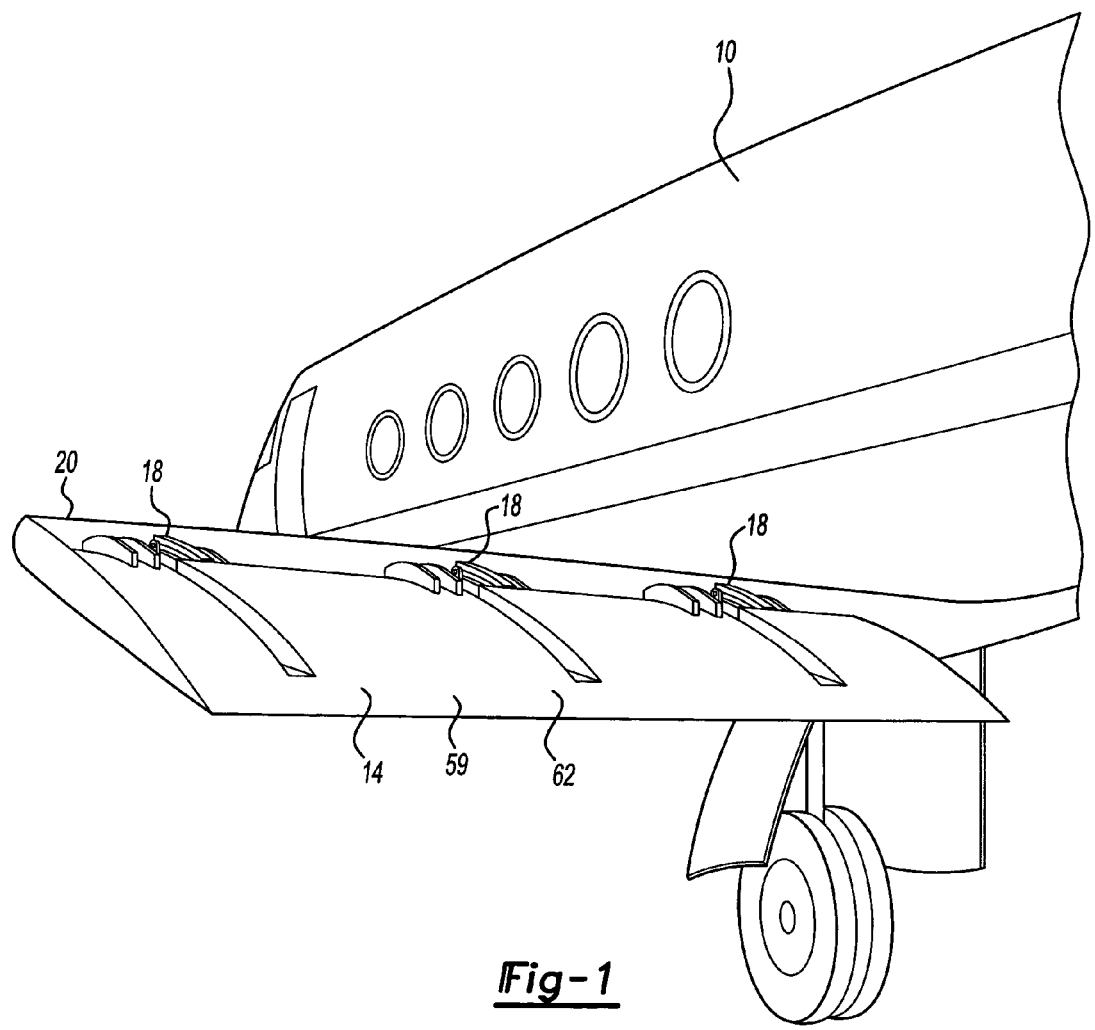
FIG. 1 illustrates a perspective view of an aircraft, an aircraft wing and an aircraft flap.

FIG. 1 illustrates a perspective view of aircraft 10 having aircraft flap 14 and wing 20. As known, aircraft flap 14 moves along flap track 18 to thereby orient aircraft flap 14 up and down. Multiple tracks 18 are shown supporting flap 14 on wing 20.

Figure 2:
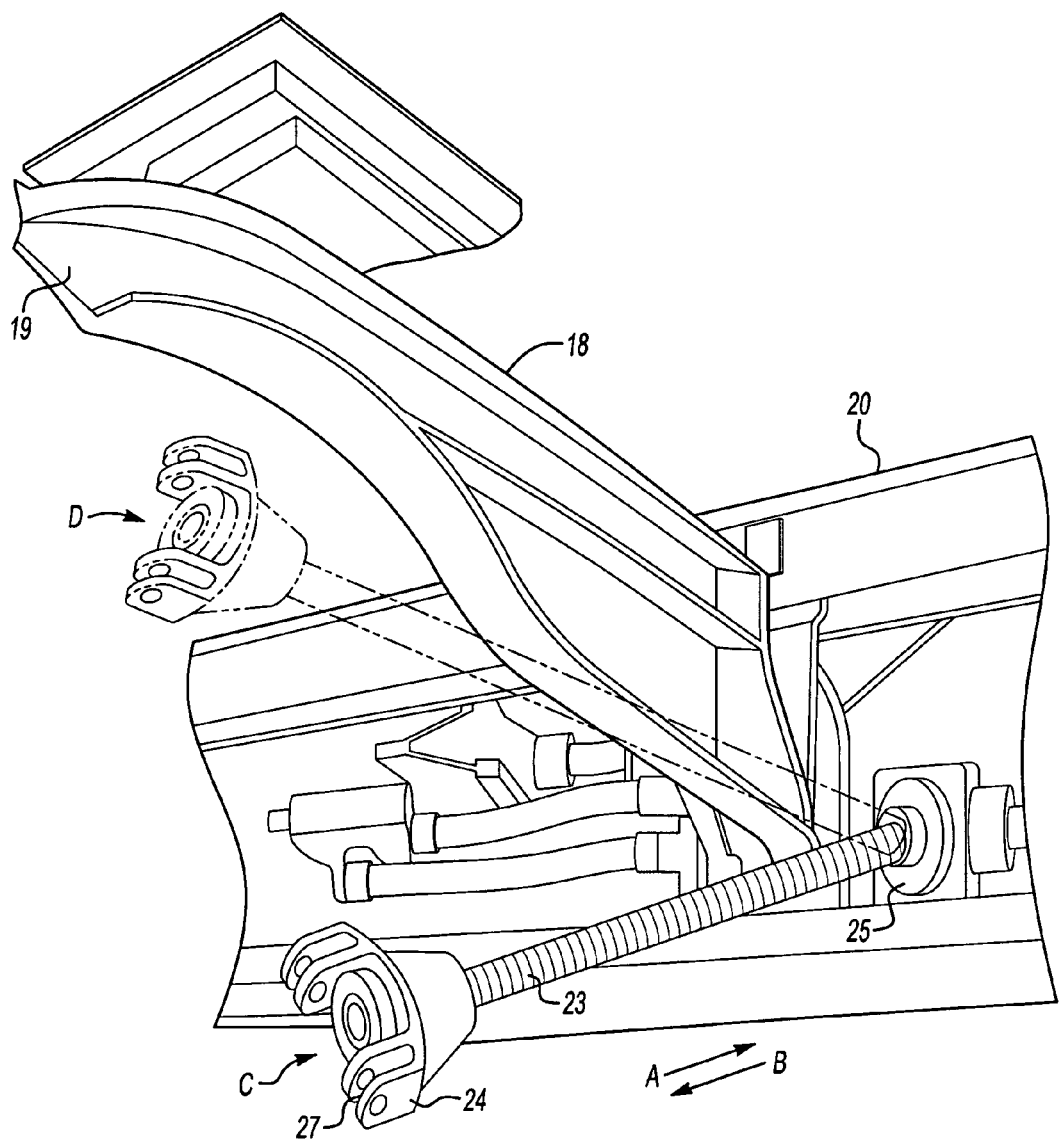
FIG. 2 illustrates a flap track and a flap actuator of the aircraft wing.

FIG. 2 illustrates flap track 18 with aircraft flap 14 removed, such as for service. As shown, flap track 18 is mounted to wing 20 and located proximate flap actuator 24. Flap track 18 has guide channels 19 on each side to receive mounting structure of aircraft flap 14 (not shown). Aircraft flap 14 is driven along guide channels 19 so as to follow a path that guides the aircraft flaps up and down as known. Aircraft flap 14 is driven by actuator 24, which has drive 25 that rotates threaded rod 23. Threaded rod 23, when rotated, causes traveling nut 27 to move generally in the direction of arrow A or arrow B to thereby move aircraft flap 14 along the same direction on flap track 18 and orient aircraft flap 14 up or down.

As further shown in FIG. 2, flap actuator 24 is normally held by aircraft flap 14 near position D as shown by dashed lines. When aircraft flap 14 is removed, flap actuator 24 is no longer supported relative to flap track 18 and accordingly droops downward toward ground from position D to position C as shown. At this position, it is undesirable to operate flap actuator 24. In the past, flap actuator 24 was held manually at position D when serviced. Given that there are multiple flap tracks and flap actuators associated with each wing, it was very labor intensive to test each of the flap actuators of the aircraft.

Figure 3:
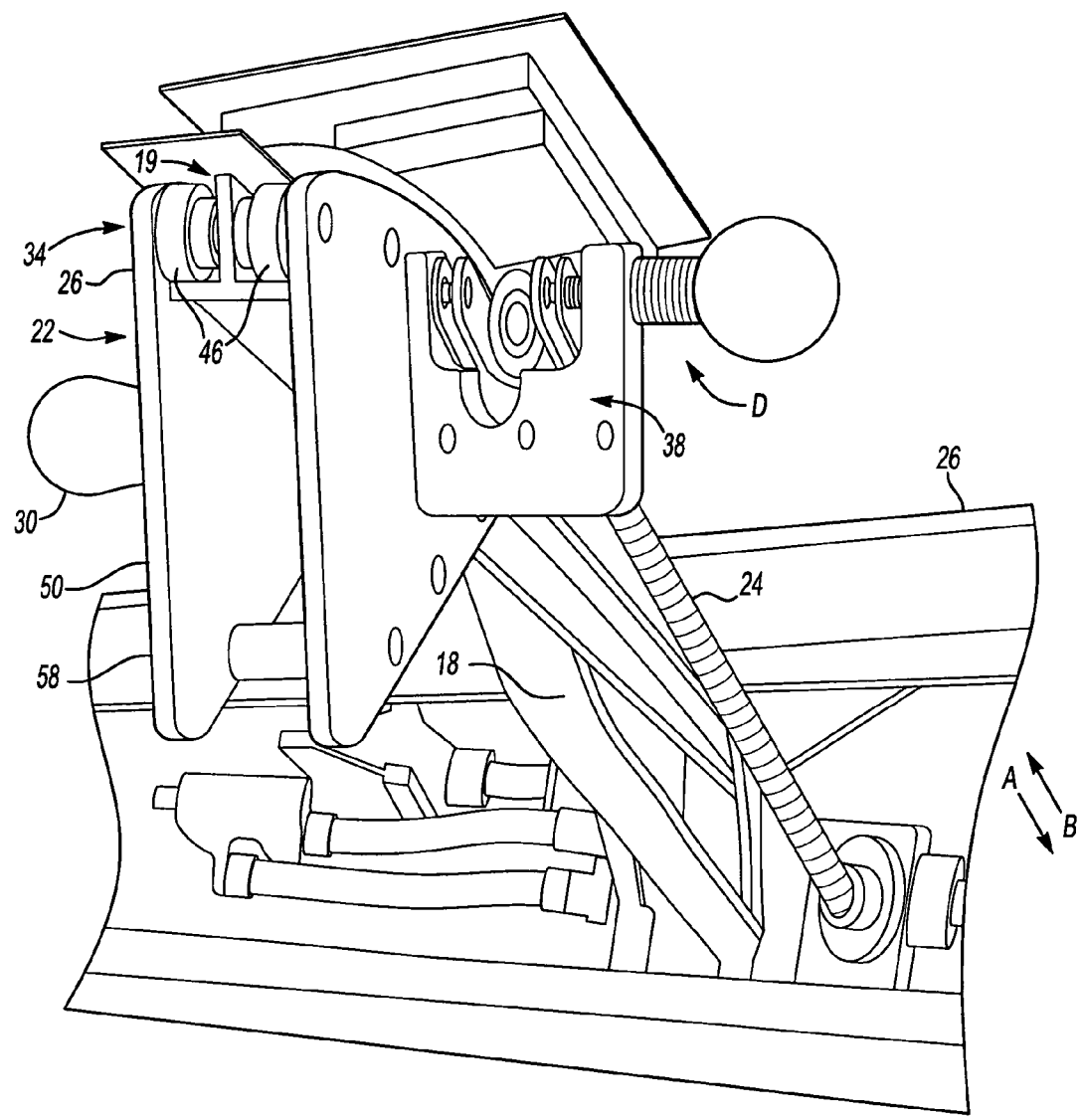
FIG. 3 illustrates the inventive support holding the flap actuator to the flap track.

To address this problem, as shown in FIG. 3, inventive flap simulator 22 supports flap actuator 24 in its normal position during operation at position D. FIG. 3 illustrates how flap simulator 22 accomplishes this objective. Flap simulator 22 has support 26 made of a rigid material, such as metal. Support 26 has first couple 34 that is linked to flap track 18. Support 26 also has second couple 38 that links support 26 to flap actuator 24. In this way, flap actuator 24 is held at position D, i.e., the position of normal operation of flap actuator 24.

To simulate movement of aircraft flap 14, first couple 34 has guide structure 46, here rollers, that allow support 26 to roll on flap track 18 through guide channels 19, that receive guide structure 46. Guide structure 46 can thereby roll along guide channel 19 as flap actuator 24 is driven. Flap simulator 22 thus follows the same path as aircraft flap 14, simulating its movement.

Second couple 38 is formed with support 26 so as to create a rigid connection between support 26 and flap actuator 24, which is received in second couple 38. To secure flap actuator 24 to second couple 38, there is provided an adjustment feature 42, here a threaded screw with a spring bias, that allows a size of second couple 38 to be adjusted to accommodate differing sizes of flap actuators as may be found with differing aircraft. In this way, a single flap simulator 22 may be used on different aircraft. As can be noted by comparing FIG. 3 with FIG. 1, support 26 is much smaller in volume and size than aircraft flap 14 and is further lighter. Support 26 has volume 50 and weight 58 greatly smaller than anticipated weight 62 and anticipated volume 54 of aircraft flap 14. The small size of support 26 permits easy viewing of the internal workings of aircraft wing 20 and moving parts such as actuator 24.

Figure 4:
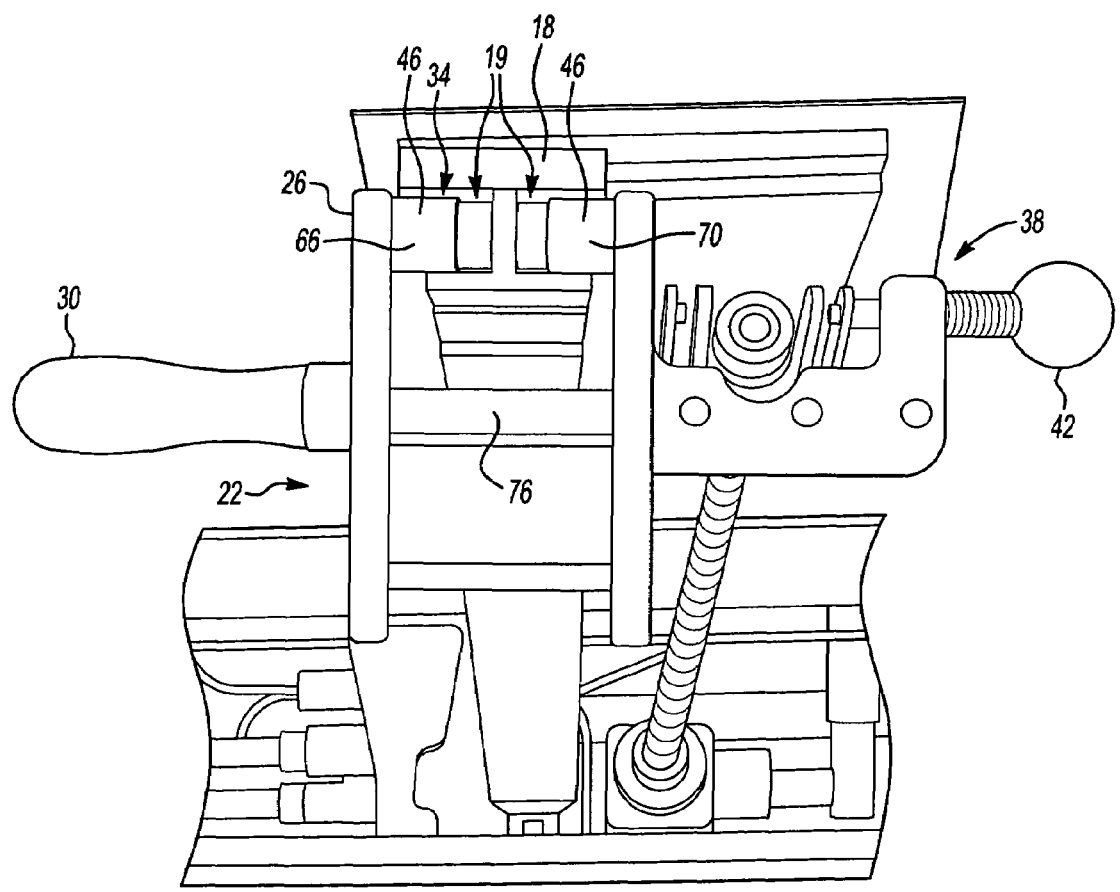
FIG. 4 illustrates an alternative view of the support of FIG. 3, showing a handle, guide structure, and an adjustment feature.
Figure 5:
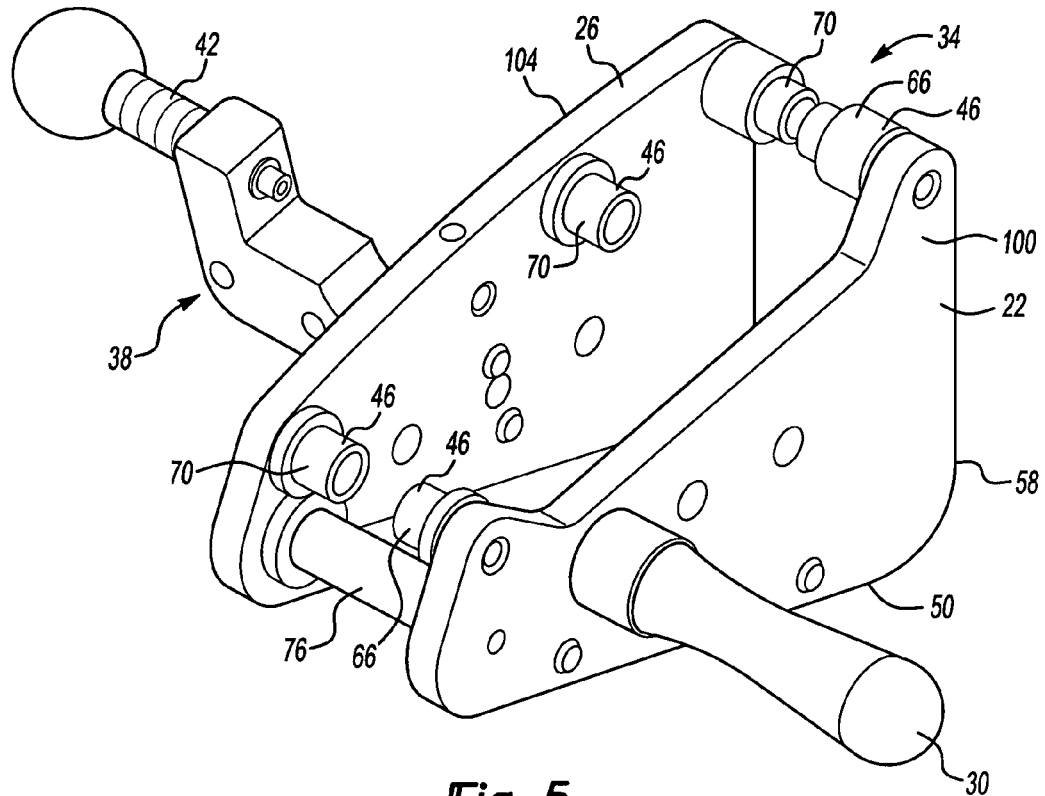
FIG. 5 illustrates a perspective view of the support of FIGS. 3 and 4.

FIG. 4 illustrates support 26 from an alternative view toward the front of aircraft 10. This view shows handle 30 used to place support 26 on flap track 18. Also, as shown, flap track 18 is shown with two guide channels 19. Support 26 has guide structure 46, here rollers, received in each of guide channels 19. In addition, bottom roller 76 is provided to secure support 26 from below flap track 18. FIG. 5 illustrates a perspective view of the support 26 shown in FIGS. 3-4, illustrating guide structure 46 in greater detail. Support 26 comprises two generally parallel plates, 100 and 104.

Figure 6:
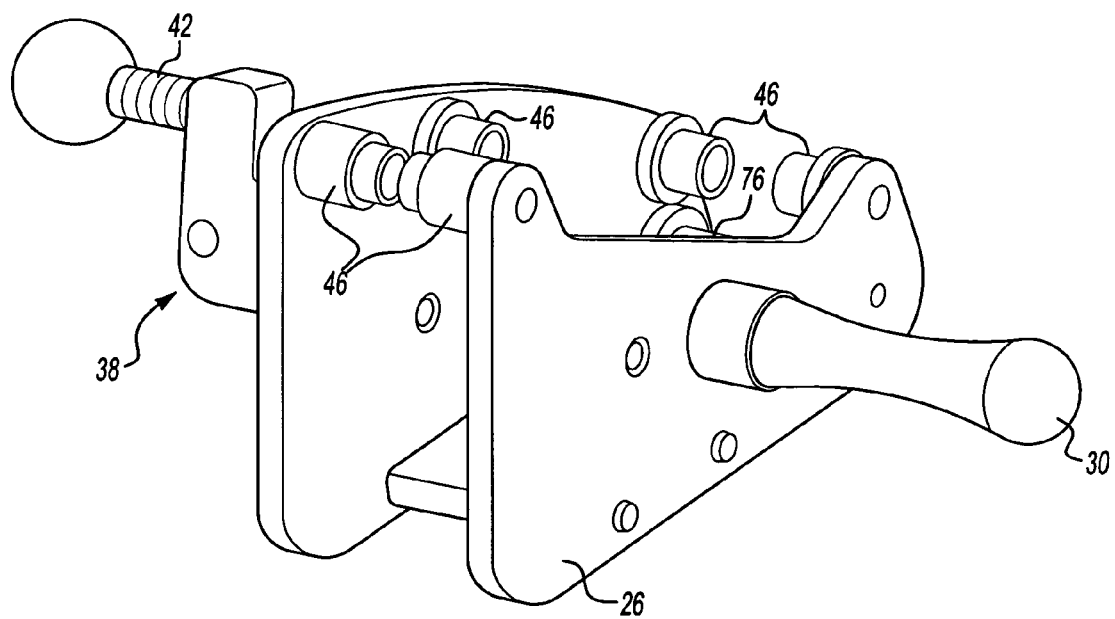
FIG. 6 illustrates a perspective view of another inventive support configured to be received by a flap track, having a flap actuator on the other side of the flap track compared to the flap track of FIG. 2.

It should be noted that support 26 may have second couple 38 placed on plate 100 instead of plate 104 to accommodate a flap actuator on a mirror side of flap track 18. FIG. 6 illustrates such alternative version of flap simulator. Here, handle 30 and second couple 38 are located on opposite sides of support 26 as shown in FIG. 5. This alternative flap simulator 74 is designed in this manner to accommodate actuators that may be found on the opposite side of flap track 18.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A flap simulator for an aircraft, comprising:
   a support having a handle;
   a first couple on said support, said first couple selectively engageable to a flap track for guiding an aircraft flap;
   a second couple on said support, said second couple selectively engageable to a flap actuator for moving the aircraft flap along the flap track; and
   an adjustment feature on said support, said adjustment feature for permitting a size of said second couple to be changed to accommodate another flap actuator, wherein said support is not coupled to the aircraft flap to be received on the flap track, wherein said first couple has a first link and a second link, said first link for coupling to a first side of the flap track and said second link for coupling to a second side of the flap track, said first link and said second link permitting said support to move relative to the flap track.

2. The flap simulator of claim 1 wherein said first couple is rigidly linked to said second couple to prevent relative movement between said first couple and said second couple.

3. A method of servicing an aircraft, the method comprising the steps of:
   a) disconnecting an aircraft flap from an actuator for moving the aircraft flap on the aircraft;
   b) removing the aircraft flap from a track for guiding the aircraft flap on the aircraft;
   c) coupling the actuator to a support disconnected from the aircraft flap;
   d) coupling the support to the track; and
   e) decoupling the support from the track prior to flight.

4. The method of claim 3, including the step of:
   f) adjusting a first size of the support to accommodate a second size of the actuator.

5. The method of claim 3, including the step of:
   g) moving the support along the track by activating the actuator.

* * * * *